US011966655B2

(12) United States Patent
Fujimori

(10) Patent No.: US 11,966,655 B2
(45) Date of Patent: Apr. 23, 2024

(54) METHOD FOR CONTROLLING PROJECTING SYSTEM, PROJECTING SYSTEM, AND PROJECTOR

(71) Applicant: SEIKO EPSON CORPORATION, Tokyo (JP)

(72) Inventor: Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/541,414

(22) Filed: Dec. 3, 2021

(65) Prior Publication Data

US 2022/0179607 A1    Jun. 9, 2022

(30) Foreign Application Priority Data

Dec. 3, 2020   (JP) ................................ 2020-201007

(51) Int. Cl.
*G06F 3/14*      (2006.01)
*G06F 3/0482*    (2013.01)

(52) U.S. Cl.
CPC .............. *G06F 3/14* (2013.01); *G06F 3/0482* (2013.01)

(58) Field of Classification Search
CPC .......... G06F 3/14; G06F 3/0482; G06F 3/048; G09G 3/002; G09G 3/20; G09G 2354/00
See application file for complete search history.

(56) References Cited

U.S. PATENT DOCUMENTS

| 10,691,397 | B1* | 6/2020 | Clements | G06F 3/0484 |
| 2005/0223338 | A1* | 10/2005 | Partanen | G06F 3/0482 |
| | | | | 715/705 |
| 2016/0360167 | A1* | 12/2016 | Mitchell | H04N 9/3182 |
| 2019/0286286 | A1* | 9/2019 | Yamamoto | H04N 23/631 |

FOREIGN PATENT DOCUMENTS

JP    2012-168793    9/2012

* cited by examiner

*Primary Examiner* — Adam R. Giesy
(74) *Attorney, Agent, or Firm* — Dority & Manning, P.A.

(57) ABSTRACT

A method for controlling a projecting system is provided. The method includes: causing a projector projecting a menu screen onto a screen to store definition information defining the menu screen; causing the information processing device to generate update information used to update the definition information; causing the information processing device to transmit the update information to the projector; causing the projector generating an updated definition information, based on the update information; by updating the definition information and causing the projector to generate the menu screen, based on the updated definition information.

7 Claims, 6 Drawing Sheets

FIG. 3

| FREQUENTLY USED ITEMS | FREQUENTLY USED ITEMS | | |
|---|---|---|---|
| IMAGE ADJUSTMENT | DISPLAY OF INFORMATION | | CHECK INFORMATION ABOUT PROJECTOR AND IMAGE SIGNAL |
| SIGNAL INPUT/OUTPUT | VOLUME | | |
| SETTINGS | AUTOMATIC PEN ALIGNMENT | | |
| DISPLAY | IMAGE ADJUSTMENT | | |
| OPERATION | COLOR MODE | PRESENTATION | |
| MANAGEMENT | BRIGHTNESS | 50 | |
| NETWORK | CONTRAST | 50 | |
| PEN/FINGER TOUCH | DEPTH OF COLOR | 50 | |
| INTERACTIVE | COLOR TONE | 50 | |
| MULTI-PROJECTION | SHARPNESS | 50 | |
| MEMORY | WHITE BALANCE | | |
| POWER SAVING | DYNAMIC CONTRAST | OFF | |
| INITIAL AND OVERALL SETTINGS | NOISE REDUCTION | 0 | |
| | MPEG NOISE REDUCTION | OFF | |
| | GAMMA | 0 | |
| | RGBCMY | | |

FIG. 6

```
                                              ┌─412
┌─────────────────────────────────────────────┐
│ COMPONENT ID:MENU_CMODE                     │
│ COLOR MODE VALUE                            │
│                                             │
│ CHARACTER STRING:COLOR MODE                 │
│ VALUE:SET VALUE-CMODE ACQUISITION (Read Only)│
├─────────────────────────────────────────────┤
│ COMPONENT ID:MENU_DYNAMIC                   │
│ COLOR MODE OPTION    OPTION 1               │
│                                             │
│ CHARACTER STRING:DYNAMIC                    │
│ EVENT PROCESSING:SET VALUE-CMODE UPDATE     │
└─────────────────────────────────────────────┘
```

METHOD FOR CONTROLLING PROJECTING SYSTEM, PROJECTING SYSTEM, AND PROJECTOR

The present application is based on, and claims priority from JP Application Serial Number 2020-201007, filed Dec. 3, 2020, the disclosure of which is hereby incorporated by reference herein in its entirety.

BACKGROUND

1. Technical Field

The present disclosure relates to a method for controlling a display system, a display system, and a display device.

2. Related Art

JP-A-2012-168793 discloses an image display device which extracts a setting item corresponding to an installation state from among a plurality of setting items and displays the extracted setting item in a menu screen.

However, in the technique described in JP-A-2012-168793, since a setting item predetermined for each device is extracted according to the installation state of the device, it may be difficult to display menu screens corresponding to other situations of use for the user.

SUMMARY

An aspect is directed to a method for controlling a display system including a display device displaying a menu screen as an on-screen display, and an information processing device. The method includes: causing the display device to store definition information defining the menu screen; causing the information processing device to generate update information used to update the definition information; causing the information processing device to transmit the update information to the display device; causing the display device to update the definition information, based on the update information; and causing the display device to generate the menu screen, based on the updated definition information.

Another aspect is directed to a display system including: a display device displaying a menu screen as an on-screen display; and an information processing device generating update information used to update definition information defining the menu screen. The display device includes: a storage circuit storing the definition information; and a processing circuit updating the definition information, based on the update information, and generating the menu screen, based on the updated definition information.

Still another aspect is directed to a display device including: a display unit displaying a menu screen as an on-screen display; a storage circuit storing definition information defining the menu screen; an input interface to which update information used to update the definition information is inputted from outside; and a processing circuit updating the definition information, based on the update information, and generating the menu screen, based on the updated definition information.

BRIEF DESCRIPTION OF THE DRAWINGS

FIG. 3 is a table explaining an example of a top screen in a menu screen.

FIG. 6 explains an example of component definition information.

DESCRIPTION OF EXEMPLARY EMBODIMENTS

Figure 1:
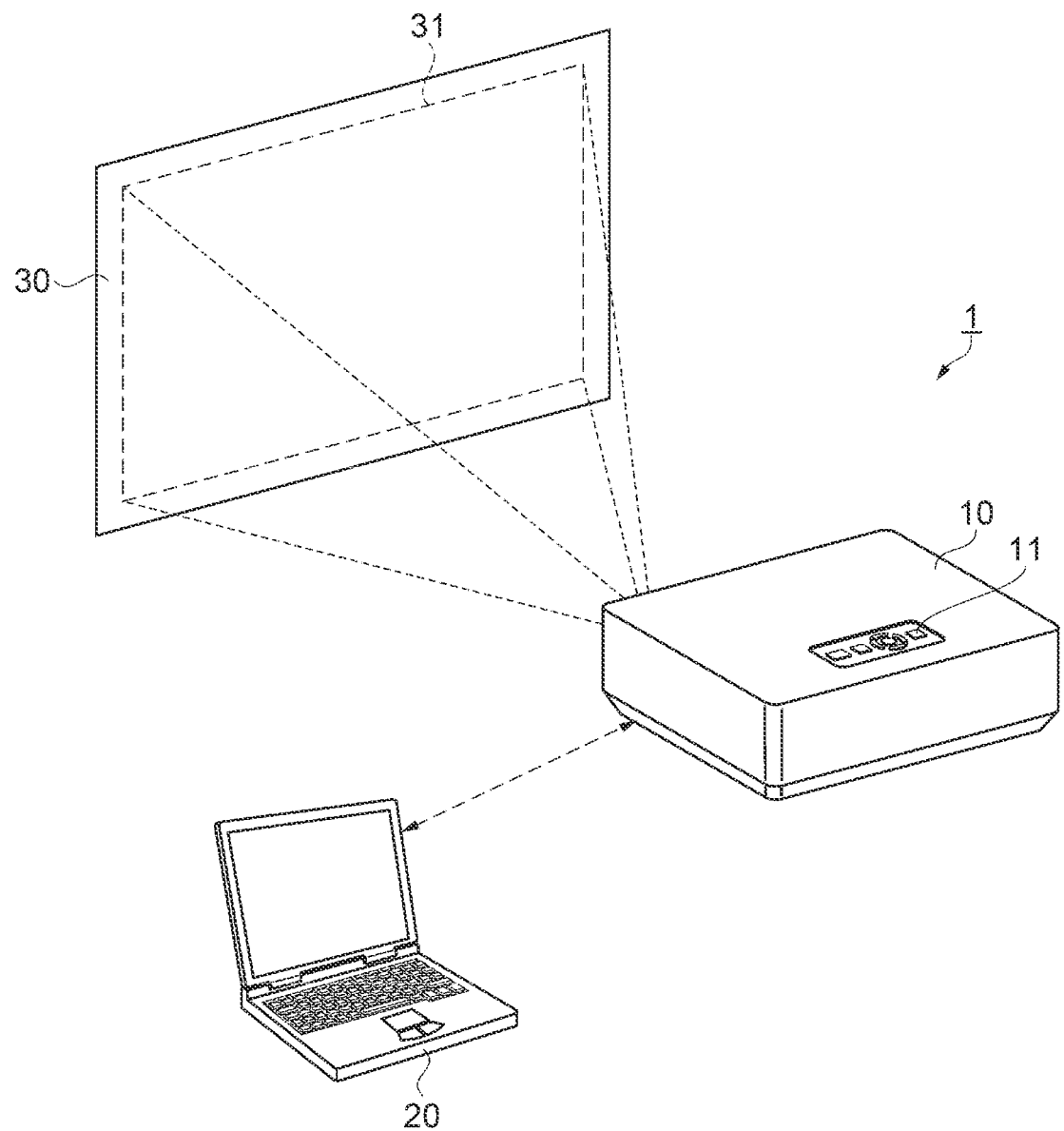
FIG. 1 is a schematic diagram explaining a display system according to an embodiment.

An embodiment of the present disclosure will now be described with reference to the drawings. In the drawings, identical or similar elements are denoted by identical or similar reference signs and repetition of the description thereof may be omitted. The embodiment described below exemplifies a system that embodies the technical idea according to the present disclosure, and a device and a method used in this system. The technical idea according to the present disclosure is not limited to the type and configuration of each device, the network topology, the series of processes or the like described below.

As shown in FIG. 1, a display system 1 according to the embodiment has a display device 10 and an information processing device 20. In the example shown in FIG. 1, the display device 10 is a projector projecting light onto a screen 30 and thus displaying an image 31 thereon. The display device 10 may be another display device such as a flat-panel display device. The flat-panel display device includes, for example, a liquid crystal display device, a plasma display device, an organic electroluminescence display device, and the like.

In the example shown in FIG. 1, the information processing device 20 is a laptop computer. The information processing device 20 may be another computer device such as a tablet terminal, a smartphone, or a desktop computer. The information processing device 20 has at least a function of generating and editing text data.

Figure 2:
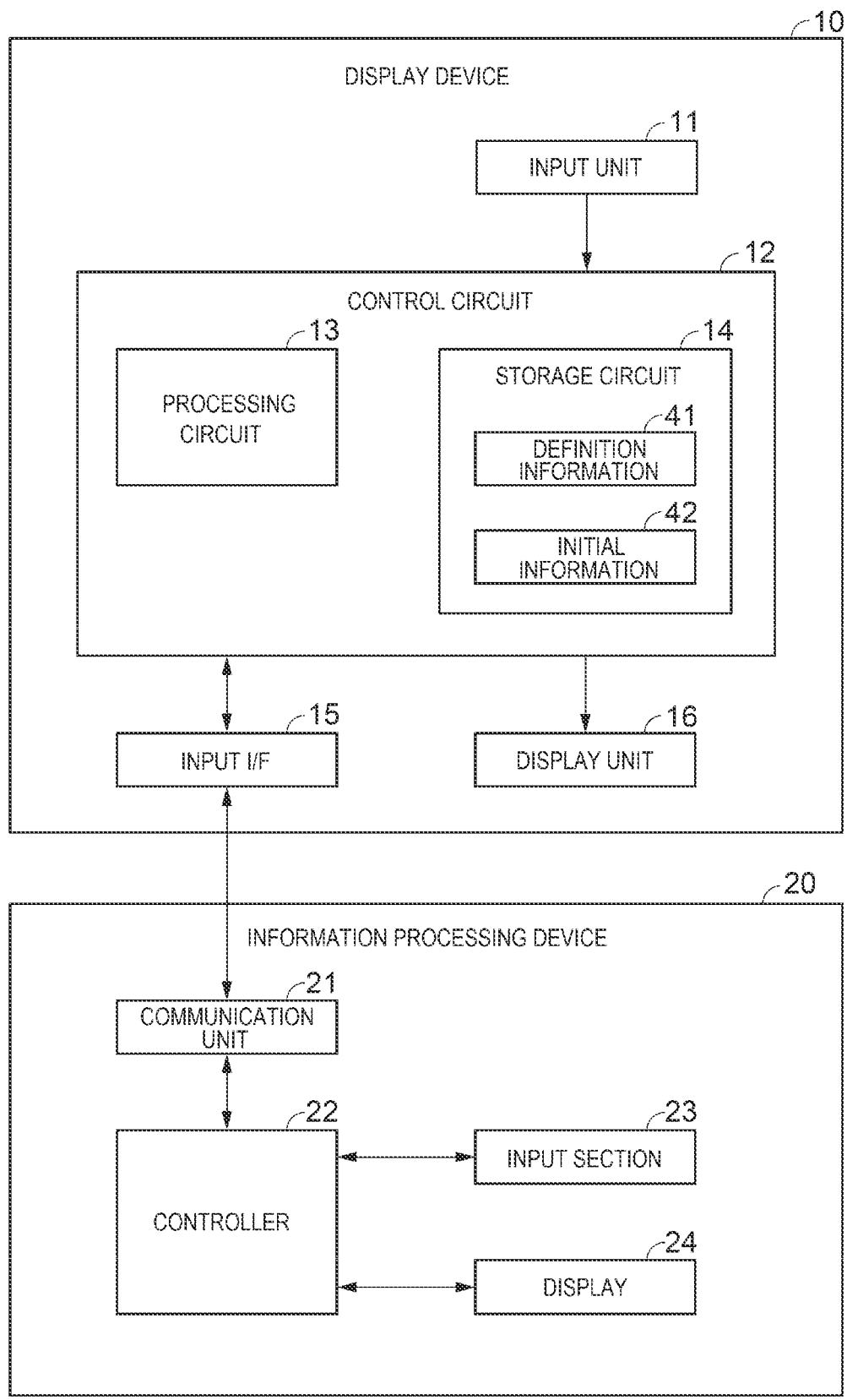
FIG. 2 is a block diagram explaining the display system according to the embodiment.

As shown in FIG. 2, the display device 10 has, for example, an input unit 11, a control circuit 12, an input interface (I/F) 15, and a display unit 16. The input unit 11 accepts an operation by a user and outputs a signal corresponding to the operation by the user to the control circuit 12. As the input unit 11, various input devices such as a push button, a touch sensor, and a pointing device can be employed. The input unit 11 can include a wireless or wired remote controller.

The control circuit 12 has a processing circuit 13 and a storage circuit 14. The processing circuit 13 forms a processing device of a computer executing computational processing that is necessary for the operation of the display device 10. The processing circuit 13 executes, for example, a control program stored in the storage circuit 14 and thus implements various functions of the display device 10 described in the embodiment. As the processing device forming at least a part of the processing circuit 13, various logical operation circuits such as a central processing unit (CPU), a digital signal processor (DSP), a programmable logic device (PLD), and an application-specific integrated circuit (ASIC) can be employed. The processing circuit 13 may be formed of a single piece of hardware or a plurality of separate pieces of hardware.

The storage circuit 14 is a computer-readable storage medium storing a control program representing a series of processes and various data that are necessary for the operation of the display device 10. As the storage circuit 14, for example, a semiconductor memory can be employed. The storage circuit 14 is not limited to a non-volatile auxiliary storage device and can include a volatile main storage device such as a register or a cache memory. At least a part of the storage circuit 14 may be formed of a part of the processing circuit 13. The storage circuit 14 may be formed of a single piece of hardware or a plurality of separate pieces of hardware.

The storage circuit 14 stores, for example, definition information 41 and initial information 42. The definition information 41 is information defining an on-screen display (OSD) displayed on the screen 30. The initial information 42 is information representing an initial state of the definition information 41. Even when the definition information 41 is changed from the initial state by an update or the like, the processing circuit 13 can restore the initial state of the definition information 41 by referring to the initial information 42.

The input I/F 15 takes in update information that is generated in the information processing device 20 and inputted from outside. For example, the input I/F 15, under the control of the processing circuit 13, establishes a communication link to the information processing device 20 and is thus communicatively coupled to the information processing device 20. The input I/F 15 can include, for example, an antenna transmitting and receiving a signal, a circuit processing a signal transmitted in the communication link, and a receptacle in which a plug of a communication cable is inserted. The input I/F 15 may be a receptacle in which a plug of an external auxiliary storage device storing update information generated by the information processing device 20 is inserted.

The display unit 16 has, for example, a light source, a display element such as a liquid crystal panel having a plurality of pixels, and an optical system including a lens and a mirror or the like. The display element modulates light emitted from the light source, in response to a drive signal representing an image generated by the processing circuit 13. The display unit 16, under the control of the processing circuit 13, projects the light coming out of the display element onto the screen 30, using the optical system, and thus displays the image 31 on the screen 30.

Image data representing the image 31 may be, for example, multimedia data transmitted from the information processing device 20 via the input I/F 15 or multimedia data transmitted from another device. Alternatively, the image data representing the image 31 may be computer graphics or the like generated by the processing circuit 13.

The information processing device 20 has a communication unit 21, a controller 22, an input section 23, and a display 24. The communication unit 21, under the control of the controller 22, establishes a communication link to the display device 10 and is thus communicatively coupled to the display device 10. The communication link may be wired or wireless and may be a combination of wired and wireless communications. That is, the communication unit 21 may be directly coupled to the display device 10 or may be indirectly coupled to the display device 10 via another communication device. The communication unit 21 can include, for example, an antenna transmitting and receiving a wireless signal, a receptacle in which a plug of a communication cable is inserted, and a circuit processing a signal transmitted in the communication link, or the like.

The controller 22 has, for example, a processing device such as a CPU, and a storage medium such as a semiconductor memory. The controller 22 executes computational processing that is necessary for the operation of the information processing device 20. The controller 22 executes, for example, a program stored in the storage medium and thus implements various functions of the information processing device 20 described in the embodiment. The storage medium of the controller 22 stores, for example, a program representing a series of processes and various data that are necessary for the operation of the information processing device 20. The controller 22 may be formed of a single piece of hardware or a plurality of separate pieces of hardware.

The input section 23 is an input device accepting an operation by the user and outputting a signal corresponding to the operation by the user to the controller 22. The input section 23 can include, for example, a keyboard, various switches, a pointing device, and the like. The display 24 is, for example, a flat-panel display. The input section 23 and the display 24 may be integrated together as a touch panel display.

The display unit 16 displays a menu screen 50 as an OSD on the screen 30 under the control of the processing circuit 13, for example, as shown in FIG. 3. In FIG. 3, a top screen 51 including a category list 511 and an item list 512 is illustrated as the menu screen 50. The category list 511 includes a plurality of categories of menu items relating to the display device 10, as options to be selected by the user. The item list 512 includes menu items and information corresponding to the menu items or the like, as options to be selected by the user. In the example shown in FIG. 3, an item of "DISPLAY OF INFORMATION" included in a category of "FREQUENTLY USED ITEMS" is selected and thus highlighted in response to a user operation to the input unit 11 and a hint 501 for the selected item is displayed.

Figure 4:
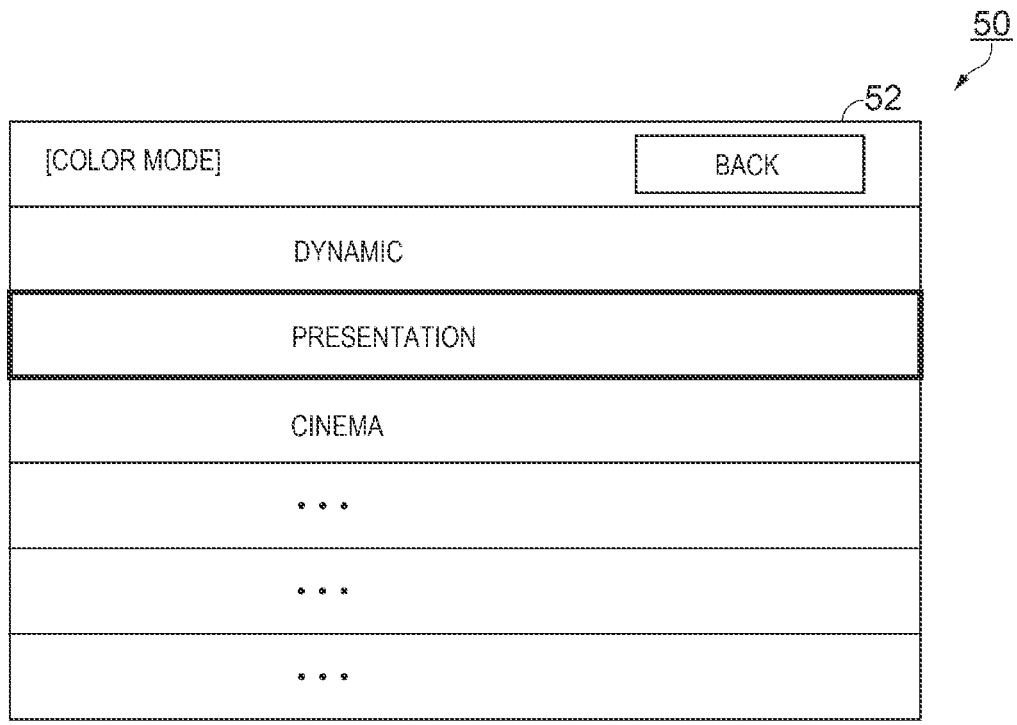
FIG. 4 is a table explaining an example of a transition screen in the menu screen.

For example, when the user executes an operation of selecting and finalizing an item of "COLOR MODE" included in a category of "IMAGE ADJUSTMENT" in the top screen 51 shown in FIG. 3, a transition screen 52 corresponding to the finalized item is displayed as the menu screen 50, as shown in FIG. 4. In this way, the menu screen 50 can transition, for example, from the top screen 51 to a particular transition screen 52 in response to a user operation to the input unit 11. The menu screen 50 may transition from the transition screen 52 to still another transition screen 52.

Figure 5:
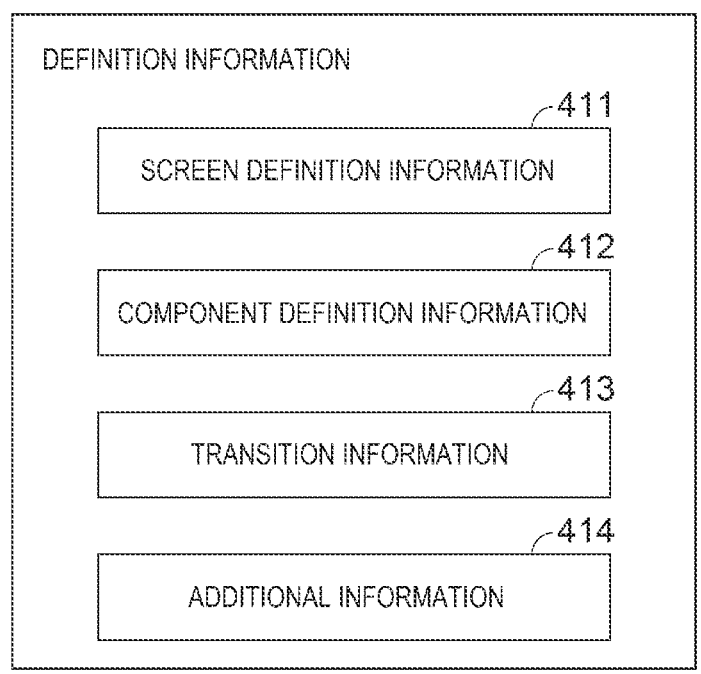
FIG. 5 explains an example of definition information.

As shown in FIG. 5, the definition information 41 includes, for example, screen definition information 411, component definition information 412, transition information 413, and additional information 414. The definition information 41 is information defining the menu screen 50. The screen definition information 411 includes, for example, a screen identifier (ID) identifying the type of the menu screen 50, a component ID identifying a component forming the menu screen 50, and information about the design of the menu screen 50 such as the layout of the component. For example, the definition information 41 defining the top screen 51 as shown in FIG. 3 includes a screen ID of "TOPMENU". For example, the definition information 41 defining the transition screen 52 for the color mode as shown in FIG. 4 includes a screen ID of "CMODE".

As shown in FIG. 6, the component definition information 412 is information defining a component of the menu screen 50. The component definition information 412 includes, for example, a component ID identifying a component of the menu screen 50, a character string shown in the component, and information representing a value and event processing corresponding to the component. For example, the component definition information 412 corresponding to the menu item of "COLOR MODE" in the top screen 51 as shown in FIG. 3 includes a component ID "MENU_CMODE", a character string "COLOR MODE", and a value "SET VALUE-CMODE ACQUISITION". "SET VALUE-CMODE ACQUISITION" means, for example, that the set color mode value is displayed.

The component definition information 412 corresponding to the first option in the transition screen 52 for the color mode as shown in FIG. 4 includes a component ID "MENU_DYNAMIC", a character string "DYNAMIC", and event processing "SET VALUE-CMODE UPDATE". "SET VALUE-CMODE UPDATE" means, for example, that the set color mode value is updated to a selected value.

The transition information 413 is information defining the menu screen 50 transitioning in response to a user operation. The transition information 413 includes, for example, a screen ID of a source menu screen 50, a component ID of the source menu screen 50, a screen ID of a destination menu screen 50, a component ID of the destination menu screen 50, and the like. For example, the transition information 413 defining a transition from the top screen 51 shown in FIG. 3 to the transition screen 52 shown in FIG. 4 includes a component ID "MENU_CMODE" of an option serving as a trigger for the screen transition, and a screen ID "CMODE" of the destination.

The additional information 414 includes, for example, information about design such as color in the menu screen 50. The additional information 414 includes, for example, information designating a color for each part of the menu screen 50 and information designating a value relating to the layout of the menu screen 50.

The information processing device 20 generates update information used to update the definition information 41. The update information may form the entirety of the definition information 41 or only the part to be updated, of the definition information 41. The update information is generated by the controller 22 in response to a user operation to the input section 23. For example, the update information is text data that can be edited by a text editor, for example, in an XML (Extensible Markup Language) format or the like. Therefore, the definition information 41 can be text data.

Specifically, the information processing device 20 can generate information equivalent to at least a part of each of the screen definition information 411, the component definition information 412, the transition information 413, and the additional information 414, as the update information. For example, it is assumed that, of the definition information 41 stored in the storage circuit 14, only the component definition information 412 defining the menu item of "COLOR MODE" and one option in the menu item is updated. In this case, the update information may be the component definition information 412 corresponding to two types of components IDs, as shown in FIG. 6.

As a generation program for generating the update information in the information processing device 20, a general text editor may be employed or a dedicated simulator may be employed. The simulator is installed, for example, in the controller 22 in advance, generates a simulation screen equivalent to the menu screen 50 in response to a user operation to the input section 23, and displays the simulation screen on the display 24. The controller 22 stores, for example, information corresponding to the definition information 41 in advance and thus can display the simulation screen equivalent to the menu screen 50, based on the update information. As the simulation screen is displayed on the display 24, the user can check the operation of the menu screen 50 based on the update information.

The controller 22 transmits the update information to the display device 10 via the communication unit 21, for example, in response to a user operation to the input section 23. When the update information is received by the input I/F 15, the update information is stored as available update information, for example, in a temporary storage area in the storage circuit 14. The update information may be stored in an external auxiliary storage device and may be made available to the display device 10 when the external auxiliary storage device is coupled to the display device 10. Alternatively, the update information may be transmitted from the information processing device 20 to the display device 10 via a network such as the internet or a local area network.

In this way, the input I/F 15 in the display device 10 takes in the update information generated in the information processing device 20 and inputted from outside. The processing circuit 13 updates the definition information 41 stored in the storage circuit 14, based on the update information acquired via the input I/F 15. The processing circuit 13 generates the menu screen 50, based on the updated definition information 41, and causes the display unit 16 to display the menu screen 50. The processing circuit 13 may update the definition information 41 in response to a user operation to the input unit 11, without using the update information acquired from outside.

Alternatively, the update of the definition information 41 may be handled as a temporary update that is not reflected in the menu screen 50 next time the menu screen 50 is displayed. In this case, the processing circuit 13 reads the definition information 41 from the storage circuit 14 and generates the menu screen 50, based on the definition information 41 updated with the update information. The processing circuit 13 may destroy the update information, for example, when the power of the display device 10 is turned off or the like, without changing the definition information 41 stored in the storage circuit 14 in advance.

Figure 7:
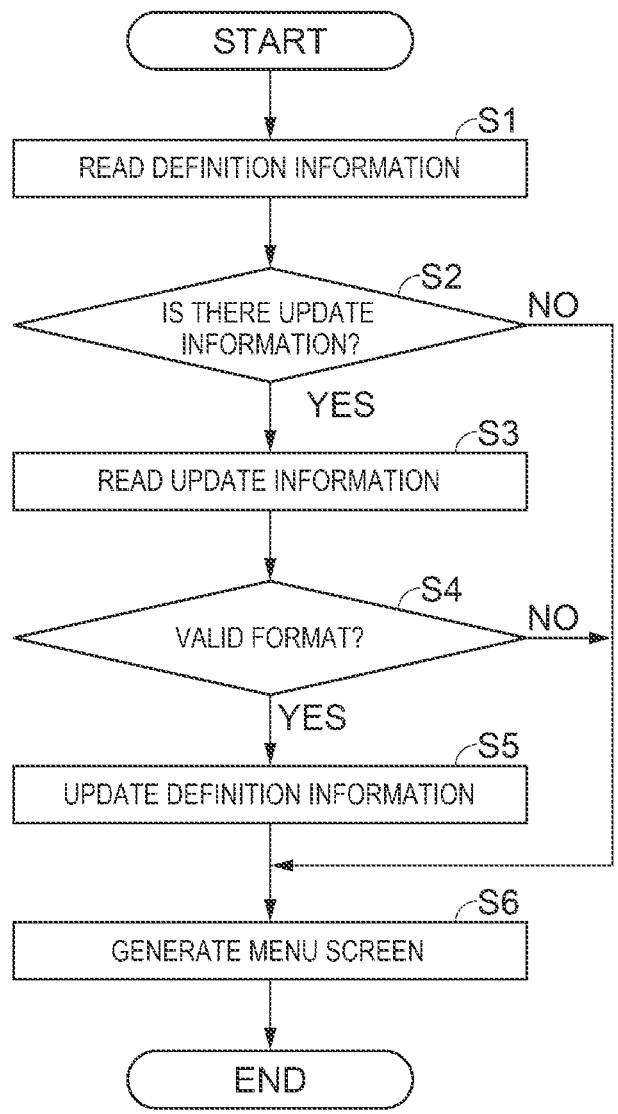
FIG. 7 is a flowchart explaining a method for controlling the display system according to the embodiment.

As a method for controlling the display system 1 according to the embodiment, an example of the operation of the display device 10 will now be described with reference to the flowchart of FIG. 7. A series of processes shown in FIG. 7 can be started, for example, at the startup of the display device 10 or when an operation designating the display of the menu screen 50 is accepted, or the like.

In step S1, the processing circuit 13 reads the definition information 41 stored in the storage circuit 14. In step S2, the processing circuit 13 determines whether there is update information available for use or not. The determination in step S2 is started, for example, in response to a user operation giving an instruction to read update information. Alternatively, when the update information is transmitted to the display device 10 from outside via the network, the determination may be started in response to the reception of a special command giving an instruction to read the update information. When there is the update information, the processing circuit 13 proceeds to the processing of step S3. When there is no update information, the processing circuit 13 proceeds to the processing of step S6.

In step S3, the processing circuit 13 reads the update information available for use. In step S4, the processing circuit 13 determines whether the update information is described in a valid format or not. When the update information is in a valid format, the processing circuit 13 proceeds to the processing of step S5. When the update information is in an invalid format, the processing circuit 13 proceeds to the processing of step S6.

In step S5, the processing circuit 13 updates the definition information 41 stored in advance in the storage circuit 14, based on the update information read in step S3. In step S6, the processing circuit 13 generates the menu screen 50, based on the definition information updated in step S5, and causes the display unit 16 to display the menu screen 50.

In the display system 1 according to the embodiment, the definition information 41 defining the menu screen 50 can be updated, based on the update information generated in the information processing device 20. Therefore, menu screens 50 corresponding to various situations of use can be prepared in advance without editing the definition information 41 by an operation to the display device 10. In this way, in the display system 1, a menu item that need not be changed according to the environment where the display device 10 is installed or the like can be deleted from the menu screen 50 in advance, and a menu item expected to be frequently used can be preferentially displayed in the menu screen 50. Thus, for example, the menu screen 50 taking into account the environment where the display device 10 is installed and a particular user, can be provided. Therefore, the convenience of the user is improved.

Also, in the display system 1, the update information generated in the information processing device 20 can be inputted to the display device 10 via another auxiliary storage device or a network. Therefore, the definition information 41 need not be edited in advance for each display device 10. The definition information 41 can be easily shared among a plurality of display devices 10.

Also, in the display system 1, the update information is text data and therefore can be easily edited. The update information can dynamically update the definition information 41 at the startup of the display device 10. As described above, the update information may include minimum necessary information for changing the definition information 41. Thus, only a part corresponding to the information described in the update information, of the existing definition information 41 in the storage circuit 14, is overwritten.

While the embodiment has been described above, the present disclosure is not limited to the embodiment. The configuration of each part may be replaced by any configuration having a similar function. Also, any configuration in each example of embodiment may be omitted or added within the technical scope of the present disclosure. Based on such descriptions, various alternative embodiments will be made obvious to a person skilled in the art.

For example, as a type of menu item in the menu screen 50, a special type that is not displayed in the standard menu screen 50 may be provided. This can restrict a user operation which the manager wishes to prohibit. For example, when a special type that need not be used in normal times, such as version information of firmware, warning information, and log information including startup and end times, is provided, the display device 10 may disable the display of menu items of the special type at a time. Thus, for example, when the display device 10 is installed in a place where many and unspecified users are expected to use the display device 10, the operations available to the users can be limited. The function of disabling the display of menu items may be cancelled, for example, in response to a special operation to the input unit 11 by the manager.

The definition information 41 may define different menu screens 50, depending on the installation state of the display device 10. The update information may be inputted to the input I/F 15 from another device such as a wireless adaptor or may be inputted to the input I/F 15 via near-field communication (NFC). The storage circuit 14 may store two pieces of definition information 41, that is, the definition information 41 in a standard state and the definition information 41 updated with the update information, and the processing circuit 13 may generate the menu screen 50, based on one of these pieces of definition information 41 corresponding to a user operation.

The present disclosure also includes various other embodiments that are not described above, such as applying the foregoing various configurations to each other. The technical scope of the present disclosure is defined solely by matters specifying the present disclosure according to the claims that are reasonable, based on the foregoing description.

What is claimed is:

1. A method for controlling a projecting system comprising:

causing a projector projecting a menu screen onto a screen to store definition information defining the menu screen, the definition information comprising screen definition information, component definition information, and transition information;

causing an information processing device communicating with the projector in wired or wireless manner to generate update information used to update the definition information based at least in part on a user operation by a user, wherein the update information is controllable by the user via an input section of the projecting system;

causing the information processing device to transmit the update information to the projector;

causing the projector to generate an updated definition information, based on the update information, by updating the definition information;

causing the projector to generate the menu screen, based on the updated definition information; and subsequent to generating the updated definition information, causing the projecting system to restore an initial state of the definition information by referring to initial definition information stored on a storage circuit of the projecting system.

2. The method for controlling the projecting system according to claim 1, wherein the update information is text data.

3. The method for controlling the projecting system according to claim 1, further comprising:

causing a display of the information processing device to display a simulation screen corresponding to the menu screen based on the update information.

4. The method for controlling the projecting system according to claim 3, further comprising:

causing the information processing device to generate the update information in response to a user operation of editing the update information to an input section of the information processing device.

5. The method for controlling the projecting system according to claim 1, wherein:

the screen definition information comprises information defining a format of the menu screen;

the component definition information comprises information defining one or more components of the menu screen; and the transition information comprises information defining the menu screen transitioning in response to the user operation.

6. A projecting system comprising:
a projector displaying a menu screen as an on-screen display; and
an information processing device communicating with the projector in wired or wireless manner and generating update information used to update a definition information defining the menu screen, the definition information comprising screen definition information, component definition information, and transition information,
the projector including a storage circuit storing the definition information, and a processing circuit generating an updated definition information, based on the update information, by updating the definition information and generating the menu screen, based on the updated definition information,
wherein the processing circuit is configured to restore an initial state of the definition information by referring to initial definition information stored on the storage circuit,
wherein the update information is controllable by a user via an input section of the projecting system.

7. A projector comprising:
a display unit projecting a menu screen onto a screen;
a storage circuit storing definition information defining the menu screen, the definition information comprising screen definition information, component definition information, and transition information;
an input interface to which update information used to update the definition information is inputted from outside; and
a processing circuit updating the definition information, based on the update information, and generating the menu screen, based on the updated definition information,
wherein the processing circuit is configured to restore an initial state of the definition information by referring to initial definition information stored on the storage circuit,
wherein the update information is controllable by a user via an input section of the projector.

* * * * *